US005377014A

United States Patent [19]

Knauer et al.

[11] Patent Number: 5,377,014
[45] Date of Patent: Dec. 27, 1994

[54] APPARATUS AND METHOD FOR DISPLAYING RECORDED COMPRESSED DIGITAL HIGH DEFINITION VIDEO INFORMATION

[75] Inventors: Scott C. Knauer, Mountainside; Kim N. Matthews, Watchung; Arun N. Netravali, Westfield; Eric D. Petajan, Watchung, all of N.J.

[73] Assignee: AT&T Corp., Murray Hill, N.J.

[21] Appl. No.: 817,206

[22] Filed: Jan. 6, 1992

[51] Int. Cl.$^5$ .................. H04N 5/783; H04N 7/13
[52] U.S. Cl. ..................... 358/335; 358/312; 348/409
[58] Field of Search ............. 358/335, 310, 330, 312, 358/133, 141, 136, 142, 146, 426, 431, 261.1; 360/33.1, 35.1, 10.1; 375/122; 348/390, 397, 409, 437; H04N 5/783, 7/12, 7/13

[56] References Cited

U.S. PATENT DOCUMENTS

| | | | |
|---|---|---|---|
| 3,666,888 | 5/1972 | Sekimoto | 358/186 |
| 4,280,147 | 7/1981 | Baldwin | 360/10.1 |
| 4,484,236 | 11/1984 | Wilkinson | 360/10.3 |
| 4,805,035 | 2/1989 | Kawakami et al. | 358/310 |
| 4,876,698 | 10/1989 | Boison et al. | 358/141 |
| 4,942,476 | 7/1990 | Koga et al. | 358/335 |
| 4,943,865 | 7/1990 | Hales et al. | 358/335 |
| 5,020,058 | 5/1991 | Holden et al. | 358/133 |
| 5,023,710 | 6/1991 | Kondo et al. | 358/335 |
| 5,040,062 | 8/1991 | Knauer et al. | 358/141 |
| 5,047,852 | 9/1991 | Hanyu et al. | 358/133 |
| 5,063,444 | 11/1991 | Knauer et al. | |
| 5,067,026 | 11/1991 | Kaneko | 358/330 |
| 5,083,206 | 1/1992 | Knauer et al. | 358/141 |
| 5,134,475 | 7/1992 | Johnston et al. | 358/133 |
| 5,136,391 | 8/1992 | Minami | 358/312 |
| 5,148,274 | 9/1992 | Knauer et al. | |
| 5,198,900 | 3/1993 | Tsukagoshi | 358/136 |
| 5,243,419 | 9/1993 | Faryar et al. | 348/409 |

Primary Examiner—Tommy P. Chin
Assistant Examiner—Huy Nguyen
Attorney, Agent, or Firm—Samuel R. Williamson

[57] ABSTRACT

An apparatus provides digital data representative of a compressed high definition video image signal in a manner such that a conventional video tape recorder (VTR) employing current electrical and mechanical technologies is adaptable for reading this data for display in special modes such as fast forward, reverse and still frame. To minimize the loss of data while the VTR is operating in one of these special modes, the data representative of the high definition image signal is decoded by the apparatus to yield available time slots in the data stream. These time slots are then filled with data which duplicates the most important of the original transmitted data then existing in other time slots in the data stream. This duplicating of the data increases the likelihood that the important picture information will be read by the VTR while operating in a special mode. To facilitate fast recovery from lost of synchronization, the apparatus utilizes a small fraction of the original image which is included in each section or slice of the transmitted image. As synchronization is reacquired, the high definition video image is built from the image found in the slices.

31 Claims, 5 Drawing Sheets

APPARATUS AND METHOD FOR DISPLAYING RECORDED COMPRESSED DIGITAL HIGH DEFINITION VIDEO INFORMATION

BACKGROUND OF THE INVENTION

1. Technical Field

This invention relates to high definition television systems and more particularly, to an apparatus and method for recording and reproducing high definition video information arranged for display on a high definition television system.

2. Description of the Prior Art

There is an increasing interest in high definition television (HDTV). Indeed, it is widely anticipated that some form of HDTV will be the next major advance in television broadcasting. In a "high definition" telecast, images will be transmitted with much greater resolution than is currently provided under the standard National Television System Committee (NTSC) system. The current thinking is that HDTV in the United States will offer approximately six times as much information per frame than is currently transmitted. If no changes are made in the manner of forming the television signals, that would mean, of course, a six fold increase in the bandwidth required for transmitting the HDTV signal.

Conventional Television signals that are broadcast terrestrially occupy government-specified frequency channels. There is essentially no unused frequency bandwidth that can be devoted to HDTV signals except, perhaps, for the guard bands that are currently provided between adjacent NTSC TV channels. The guard bands are included in the spectrum allocation scheme to reduce the potential interference between the signals of adjacent channels. The interference might occur by virtue of unavoidable transmission into frequency bands outside the band specified for the transmitter, and/or undue reception by the receiver of signals from outside the band specified for the receiver. The challenge for HDTV designers, therefore, is to compress the HDTV signal, to communicate the compressed signal to a receiver within the available bandwidth, and to uncompress the signal within the receiver and restore to its original form, without undue degradation.

A number of techniques have been proposed in the art for reducing the bandwidth of TV images. Typically, these techniques reduce bandwidth by encoding the video signals, identifying redundancies in the encoded signals, and extracting the redundant signals in such a way that the original signal can be reconstituted by the receiver. Feasibility studies based on such bandwidth reduction techniques are currently under consideration along with the development of video tape recorders (VTRs) capable of recording and reproducing these HDTV video signals.

One such HDTV system currently under consideration is called "Digital Spectrum Compatible" (DSC)-HDTV and provides full high-definition resolution-perceived to be equal to the studio original- even after compressing the wide bandwidth signal into a 6-MHz channel. The DSC-HDTV system is described in a number of commonly assigned United States Patents. These are: U.S. Pat. No. 5,083,206 which issued to S.C. Knauer et al. on Jan. 21, 1992 and is entitled *A High Definition Arrangement Including Noise Immunity Means;* U.S. Pat. No. 5,063,444 which issued to S. C. Knauer et al. on Nov. 5, 1991 and is entitled *A High Definition Television Arrangement with Signal Selections Adapted to the Available Transmission Capacity;* U.S. Pat. No. 5,148,274 which issued to S.C. Knauer et al. on Sep. 15, 1992 and is entitled *PAM Signal Modulation with Mappings to Improve Utilization of Available Transmission Capacity;* and U.S. Pat. No. 5,134,475 which issued to J. D. Johnston et al. on Jul. 28, 1992 and is entitled *An Adaptive Leak HDTV Encoder.*

The DSC-HDTV system digitally transmits the compressed signal on currently unusable TV channels with only a minimum interference to or from NTSC channels. the DSC-HDTV system is compatible with other media, including cable, satellite, studio and home VTRs, video disc and fiber. Because the complete high-definition television signal (including video, chroma, audio, ancillary signals, decoder address, and encryption information) is encoded into one 6-MHz bandwidth signal, the system can be often adapted for use in the above mentioned TV signal applications.

In connection with the VTR application, however, some problems do arise. That is, while under normal conditions of playback, conventional VTRs will properly read video signals recorded in the DSC-HDTV system. When attempting to read these signals in special modes such as fast forward or fast reverse, problems occur in the decoding of the data representative of these video signals. It is therefore desirable to provide a VTR which is able to decode recorded DSC-HDTV signals without these limitations on the playback of information.

SUMMARY OF THE INVENTION

An apparatus provides digital data representative of a compressed high definition video or image signal in a manner such that a VTR is able to read this data for display without the aforementioned limitations during the playback of information. In the transmission of the high definition video signal, the digital data is provided in a data stream that is modulated in a bi-rate coding scheme which identifies and selects the most important picture information on a scene-by scene basis. In this coding scheme, the most important information is transmitted to the apparatus at a slow rate, and the less important information is transmitted at a faster rate to improve the accuracy of the transfer of the more important information.

To minimize the loss of data while the VTR is operating in special modes such as fast forward, reverse and still frame, and in accordance with the invention, the data representative of the high definition image signal is decoded by the apparatus to yield available time slots in the data stream. These time slots are then filled with data which duplicates the most important of the original transmitted data. This duplicating of the data increases the likelihood that the important picture information will be read by the VTR while operating in the special modes.

Should loss of synchronization of the video image occur, fast recovery of this image is necessary. To facilitate recovery of the original image, the apparatus detects this loss of synchronization and utilizes a small fraction of the original image which is included in each section or slice of the transmitted image. As synchronization is reacquired, the high definition video image is built from the image found in the slices.

BRIEF DESCRIPTION OF THE DRAWING

This invention and its mode of operation will be more clearly understood from the following detailed description when read with the appended drawing in which.

DETAILED DESCRIPTION

Figure 1:
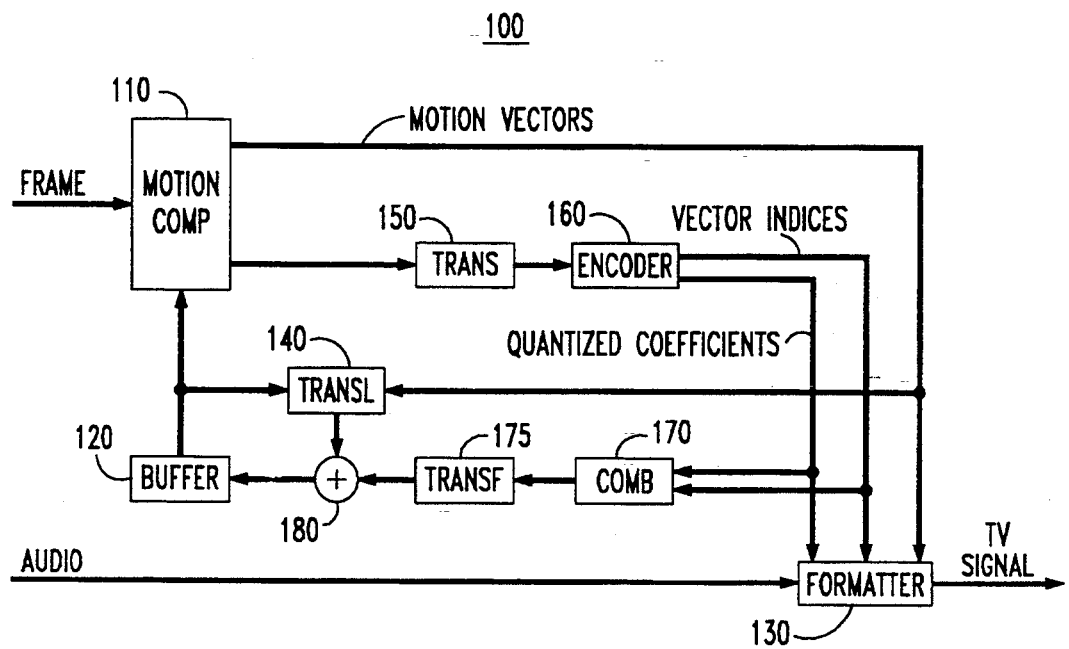
FIG. 1 is a block diagram of a video transmitter of a digital spectrum compatible system suitable for compressing wide-bandwidth signals with full high-definition resolution into a six-MHz channel.

With reference to FIG. 1, there is shown a general block diagram of a video transmitter 100 of a digital spectrum compatible HDTV system suitable for compressing wide-bandwidth signals with full high-definition resolution into a six-MHz channel and for transmitting those signals to a broad service area without detrimental interference to the signals on adjacent channels.

The video transmitter 100 receives and formats data frames of a high definition video signal. Each frame consists of two successive data fields and correspond to one standard national television system committee (NTSC) 6 MHz frame having a duration of 1/29.29 seconds. Block 110 is responsive to an incoming frame and to a previous frame stored in buffer 120. Block 110 develops motion vectors which are applied both to formatter 130 and translation circuit 140, and motion-compensated prediction error signals which are applied to transformer block 150. The prediction error signals are developed in block 110 by comparing a block of pixels in the current frame with a block in the previous frame and forming the sum of the absolute differences between the pixels, known as the prediction error. Each block in the current image is compared to displaced blocks at different locations in the previous image and the displacement vector that gives the minimum prediction error is chosen as being: the best representation of the motion of that block, i.e., the motion vector for that block. Using the motion vectors, a displaced frame difference (DFD) is then computed which generally contains a small fraction of the information in the original image. Fast recovery from channel errors, channel changes and loss of synchronization in a VTR are facilitied by having this original image information available.

Block 150 performs a transformation on the applied signals (basically a time domain to frequency domain transformation) and applies the results to encoder block 160. Encoder block 160 develops a greatly reduced set of signals, in the form of quantized coefficient signals and vector index signals, which, in combination, represent the signals created in block 150. Coding efficiency is achieved by variable length coding and transmitting the index associated with a given quantizer selection pattern instead of the pattern itself. From the encoder block 160, the developed signal streams are coupled to formatter 130 and combiner 170. The signals developed in the video encoder 160 are selected and arranged to fill the available transmission capacity with the information that is most important for an authentic recreation of the original image. For example, the encoder takes full advantage of the transmission system's ability to switch between a 1-bit per symbol and a 2-bit per symbol mode, as described in greater detail later herein. Depending upon the scene complexity, an improvement in error performance is achieved by adapting the ratio of 1-bit to 2-bit symbols in the encoder 160. And the encoder will automatically select optimum error performance for each scene.

In the feedback portion of the transmitter 100, combiner 170 is responsive to the quantized coefficient signals and the vector index signals of encoder 160. Its function is to recover the quantized coefficients that were selected and encoded in block 160. Its output is applied to transform circuit 175, and its function is to reconstitute, as best it can, the input signals of transformation block 150. The output of block 175 is added in element 180 to a motion compensated estimate of the frame and the sum is placed in buffer 120. The motion compensated estimate is developed in translation circuit 140 which is responsive both to buffer 120 and to the motion vectors.

Formatter 130 combines the information supplied by blocks 160 and 110 with audio information associated with the frame, and creates a signal in a format that is suitable for whatever transmission medium is employed by the user. The quantized coefficient signals developed by encoder 160 are organized to fit within, and are formatted to be in, the line scan interval of the frame. All of the other signals applied to formatter 130 are encoded into the retrace interval of the frame.

Figure 2:
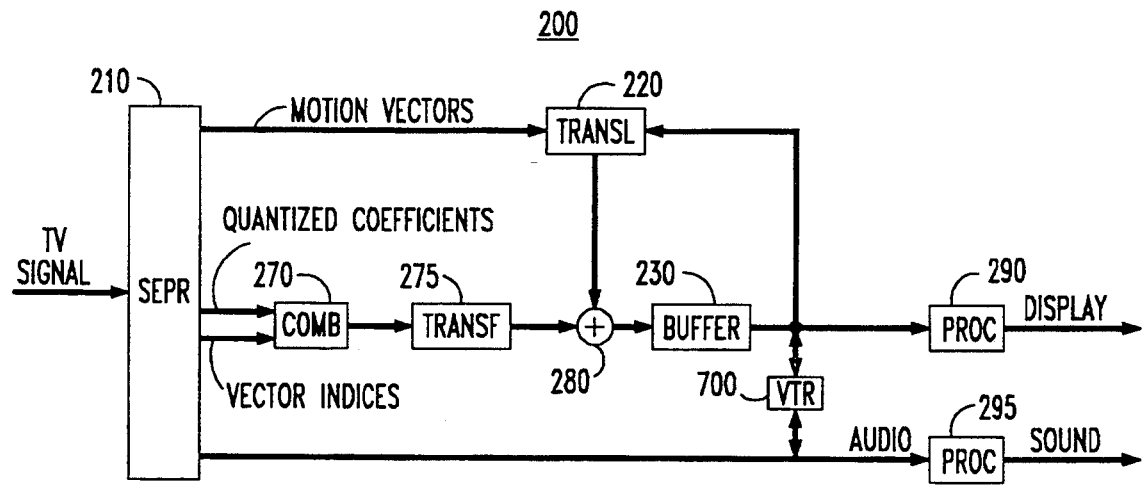
FIG. 2 is a block diagram of a receiver suitable for decoding the TV signal formatted by the transmitter of FIG. 1.

Referring next to FIG. 2, there is shown a receiver 200 suitable for decoding the TV signal formatted by the transmitter 100 of FIG. 1. This receiver includes a separator 210 which recovers the audio signals, the quantized coefficient signals of encoder block 160, the motion vector signals of block 110 and the output signals of encoder 160. The signals corresponding to the output signals of encoder 160 are applied to combiner 270. Like combiner 170, combiner 270 recovers the quantized coefficient signals selected and encoded in block 160. The output of combiner 270 is applied to transform circuit 275. This circuit reconstitutes the DFD which contains a fraction of the original image and which is written into the buffer 230. Concurrently, the motion vectors developed in block 110 are applied to translator circuit 220 which are then summed with the output of the transform circuit 275 in adder 280. Thus translator circuit 220 modifies the output of buffer 230 in accordance with those vectors thereby determining the displacement factor of the receiver frame to be stored in buffer 230 for display. From buffer 230, the receiver frame is processed in block 290 and displayed by the HDTV, and/or recorded in a VTR 700 for later processing by block 290 and for displaying by the HDTV. From the separator 210, the associated audio signal is processed in block 295 and converted to sound, and/or recorded in the VTR for later processing and converting to sound by this block 295.

The fraction of the original image in the DFD enables the reconstruction of a usable quality image from a single compressed frame for fast recovery from channel changes. This also facilitates the implementation of VTR special modes of fast forward and fast reverse scratches. One technique for obtaining this image information and also suitable for use in the DSC-HDTV system disclosed herein is disclosed in commonly assigned U.S. patent application Ser. No. 5,134,475 issued on Jul. 28, 1992 to J. D. Johnston et al. entitled *An Adaptive Leak HDTV Encoder*. In this Johnston patent application, the fractional level of the original image or "leak" signal depends on the frame signal that is being sent. Thus when a current frame signal is very different from the previous frame signal, a large portion of the signal is leaked through for encoding. When the current frame signal is not very different from the previous frame's signal, then only a small portion of the signal is leaked through. At all times, however, some signal is leaked through.

Figure 3:
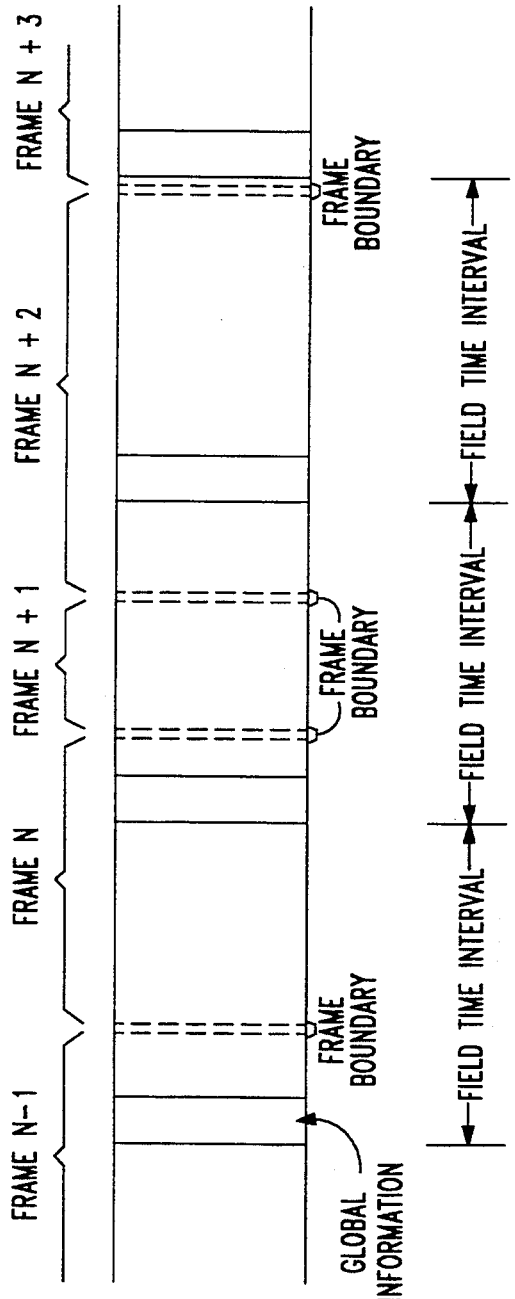
FIG. 3 shows a high definition television format employed in the digital spectrum compatible system, in accordance with the invention.

Referring next to FIG. 3, there is shown the high definition television (HDTV) format employed in accordance with the invention. A compressed video format, the HDTV fore, at fits into a standard national NTSC 6 MHz channel. The format employs multiple field time intervals each of which is approximately 1/60th of a second (specifically 1/59.94 of a second). Global information, containing parameters that are fixed length encoded, are placed in special segments at the beginning of each of the field time intervals by the formatter 130 shown in FIG. 1. The coding parameters contained in the global segments are: scale or leak factors; luminance and chrominance mean values, displaced frame factor; buffer fullness; frame number; and the frame number of the frame following the global segment. The remainder of each field time interval is devoted to high definition (HD) frame data (video) which is encoded with a variable length coding scheme.

Figure 4:
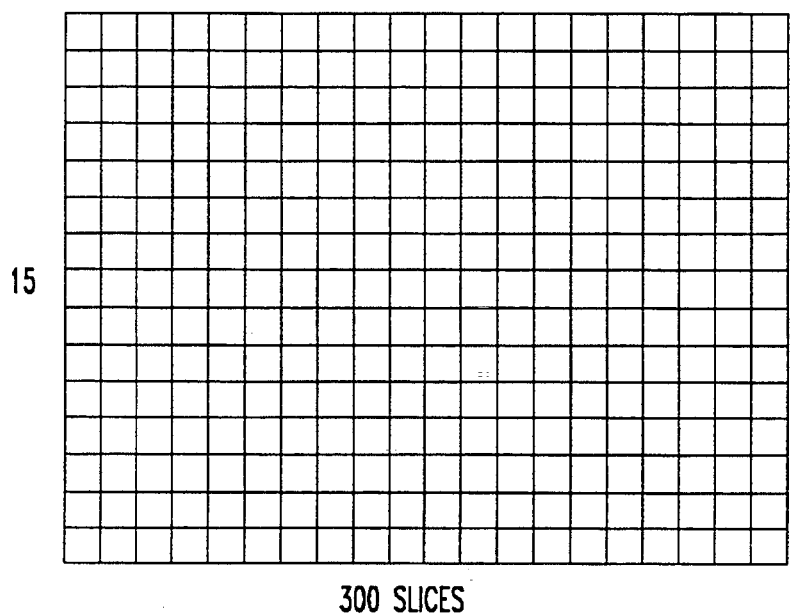
FIG. 4 shows a HD frame image array which illustratively comprises 20 rows and 15 columns of slices of data of an image.

FIG. 4 shows a HD frame image array. This array illustratively comprises 20 rows and 15 columns of slices of data or windows of an image. The amount of data that each slice generates will vary in accordance with the image data produced.

Figure 5:
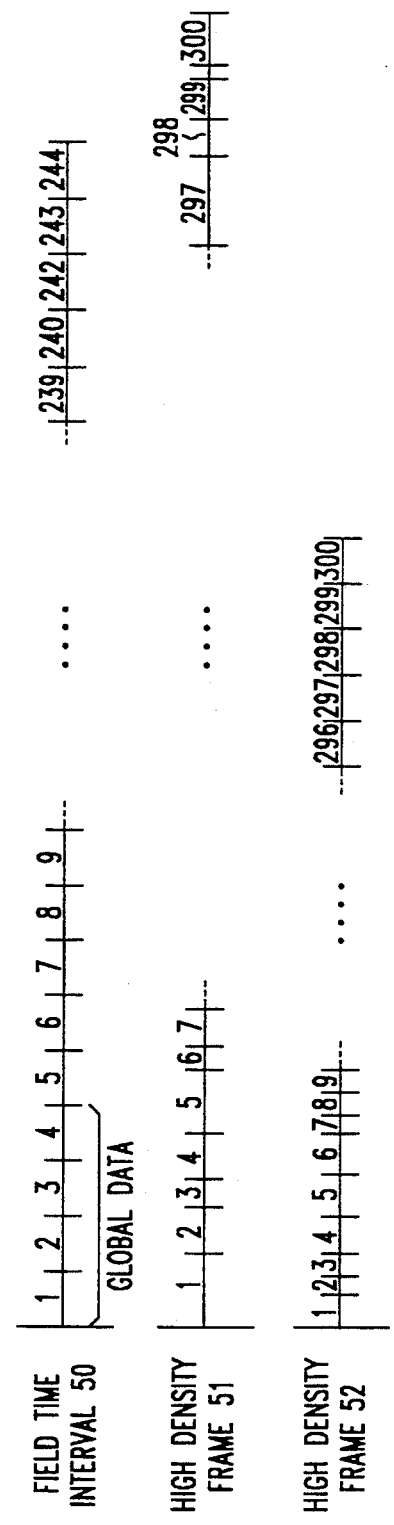
FIG. 5 illustrates the concatenation of the data of the 300 slices shown in FIG. 4.

With reference now to FIG. 5, this figure illustrates the concatenation of the data of the 300 slices shown in FIG. 4. A field time interval 50 which corresponds to a NTSC field time is shown on the first line. This time interval is divided into 244 segment times. The first four segment times are devoted to the global data and the remaining 240 segment times are devoted to the video data. Also shown in FIG. 5 are two high definition frames 51 and 52 which contain data for 300 slices. The amount of data in each slice may vary, and therefore the size of the slices may vary with respect to each other, as illustrated in these frames 51 and 52.

A given HD frame will result in a variable number of bits after compression. A segment is a fixed number of compressed video bits. A data frame contains an integer number of segments and each segment carries a fixed number of symbols.

The time period for a high definition frame may be longer or shorter than the field time interval. For example, high definition frame 51, as illustrated, has a longer time period than the field time interval 50 and conversely high definition frame 52 has a shorter time period than the field time interval 50.

Figure 6:
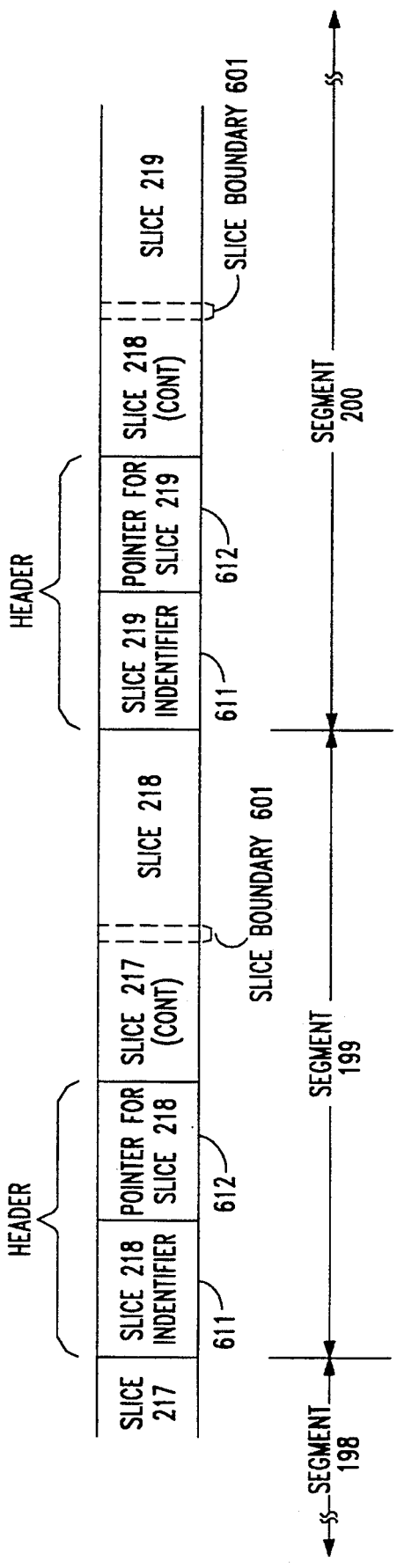
FIG. 6 shows a format for segments of video data in a high definition frame, in accordance with the invention.

Referring next to FIG. 6, there is shown the format for segments of video data in a field time interval, such as field time interval 50. Since an error at a given point in a variable length coded data stream causes data after that point to be lost, the variable length codes are packed into slices, for example, slices 217, 218 and 219, which correspond to fixed pixel regions in the original image. To avoid channel error propagation beyond a slice, the slice boundaries 601 are periodically marked in the data stream to allow a restart of variable length decoding.

The marking of the slice boundaries in the variable length encoded data stream is achieved by dividing this data stream into fixed length data segments for transmission, such as segments 198, 199 and 200. Since the variable length slices 217,218 and 219 do not correspond to the fixed length segments 198, 199 and 200, each segment is arranged to contain header information which marks the first slice boundary in the segment. Subsequent slice boundaries occurring in the same segment are not marked since during normal operation, the receiver 200, shown in FIG. 2, is able to determine when it has completed the decoding of the data for a given slice.

In the header information for each segment are two elements 611 and 612 for marking the first slice boundary in the segment. The first one of these elements 611 identifies a particular slice and the second one of these elements 612 provides a pointer to the slice boundary tier the beginning of the slice identified by the first element.

The HDTV system has a self adapting variable transmission bit rate. Some data are transmitted at 1-bit per symbol data and other data are transmitted as 2-bit per symbol data. In achieving this self adapting variable transmission bit rate, both a two-level (1-bit per symbol) and a four-level (2-bit per symbol) vestigal sideband modulation is implemented. For normal video data, the HDTV system employs the four-level vestigial sideband modulation technique which assures noise-free and interference-free reception throughout the HDTV service area. The four-level vestigial sideband coding is complemented by the two-level vestigial sideband modulation technique of the digital data which provides an improvement in error performance by increasing the ratio of 1 to 2-bit symbols in the encoder 160, in FIG. 1, in accordance with scene complexity. The encoder will automatically select optimum error performance for each scene.

The resulting hi-rate coding system thus identifies and selects the most important picture information on a scene-by-scene basis and automatically transmits the corresponding digital data as two-level digital data. The remainder of the picture information is transmitted as four-level digital data. Two level digital coding also makes the system far more tolerant of noise and other interference at great distances from the transmitter.

This allows extended reception of the signal beyond the traditional NTSC service area and eliminates the so-called "cliff effect," or complete and abrupt loss of picture, associated with some other all-digital approaches.

Figure 7:
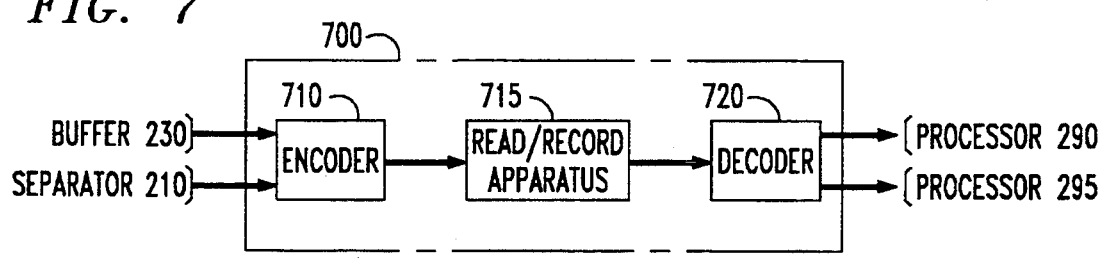
FIG. 7 is a block diagram of a video tape recorder suitable for recording and reading compressed wide-bandwidth high-definition signals, in accordance with the invention.

Referring next to FIG. 7, there is shown in greater detail the VTR 700 which includes an encoder 710, a read/record apparatus 715 and a decoder 720. Encoder 710 reformats the data stream of segments of slices received from the receiver 200. This reformatting is described later herein and with reference to FIG. 8. The reformatted data stream of segments from the encoder 710 is applied to the read/record apparatus 715 which both records and reads this data for later playback. Decoder 720 reads and inspects the data in the data stream received from the VTR read/record apparatus 715 during playback. By continually inspecting the data in the data stream, decoder 720 is able to detect the receipt of data during playback conditions which would result in loss of synchronization and subsequent loss of picture information.

Under normal conditions of playback, neither the encoder 710 nor the decoder 720 is required. Conventional VTRs, operating in an NTSC format and of the VHS or S-VHS type, will satisfactorily reproduce the compressed video data recorded in the DSC-HDTV format without modification either to the VTR or to the DSC-HDTV format. The encoder 710 and decoder 720, rather, facilitate the implementation of VTR special modes such as fast forward and fast reverse searches.

Figure 8:
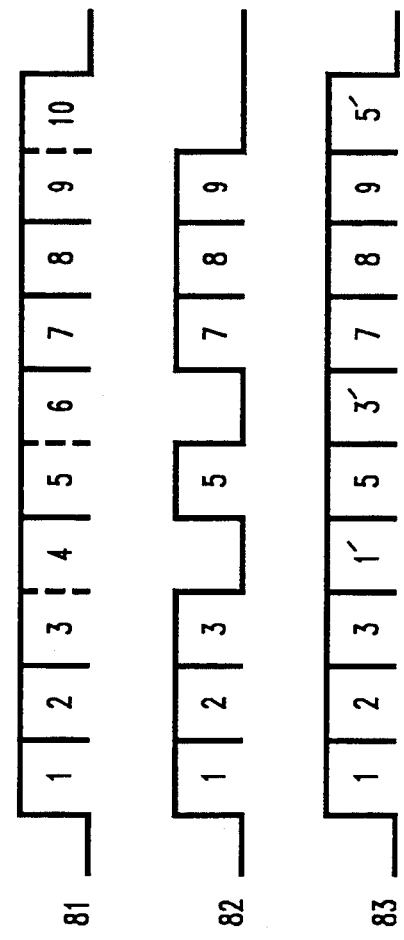
FIG. 8 shows waveforms of a data stream of slices for illustrating the treatment of the data modulated in a 1-bit per symbol format and the data modulated in a 2-bit per symbol format, in accordance with the invention.

Referring next to FIG. 8, in combination with FIG. 7, there is shown three waveforms 81, 82 and 83 of a data stream of slices for illustrating the treatment of the data modulated in the 1-bit per symbol format and the data modulated in the 2-bit per symbol format by the encoder 710. Waveform 81 represents the received data stream of segments from a transmitter such as transmitter 100 shown in FIG. 1. In this waveform, segments 1, 2, 7 and 8 are illustratively modulated in the 2-bit per symbol format. And segments 3, 5, and 9 are modulated in the 1-bit per symbol format. The formatter 130 provides the transmission system with two segment times to transmit a binary signal by following each binary segment with an empty segment.

The receiver 200 provides the data shown in waveform 81 to the encoder 710 for decoding. Once decoded, segments 4, 6, and 10 will be empty, as reflected in waveform 82. These empty segments are then populated by encoder 710 with important data from other segments, in accordance with the invention and as illustratively shown in waveform 83. In this waveform 83, for example, the data in segment 1 is again reproduced in empty segment slot 4 as 1'. Since the data in segment 1 is shown as data modulated in the 2-bit per symbol format, it should not per se be considered as data representing the more important information. It is shown here as such only for simplicity and ease of understanding the waveform. The data shown in segment 3 is similarly reproduced in empty segment slot 6 as 3'. Unlike the data shown in segment 4, however, the data shown in segment 6 is important data since it is shown as having been modulated in the 1-bit per symbol format. Finally the important data in segment 5 is reproduced in empty segment slot 10 as 5'.

Although the waveforms 81 through 83 illustrate a process whereby empty segments are generated by compressing only the data that is modulated in the 1-bit per symbol format, it should be understood that the data in the entire data stream may be compressed thereby freeing additional segments for repopulating with important data. Alternatively, the original data in the segments need not be emptied, but rather more compactly configured and retained within the segments. All of these variations are considered to be within the scope of this invention and anticipated.

Figure 9:
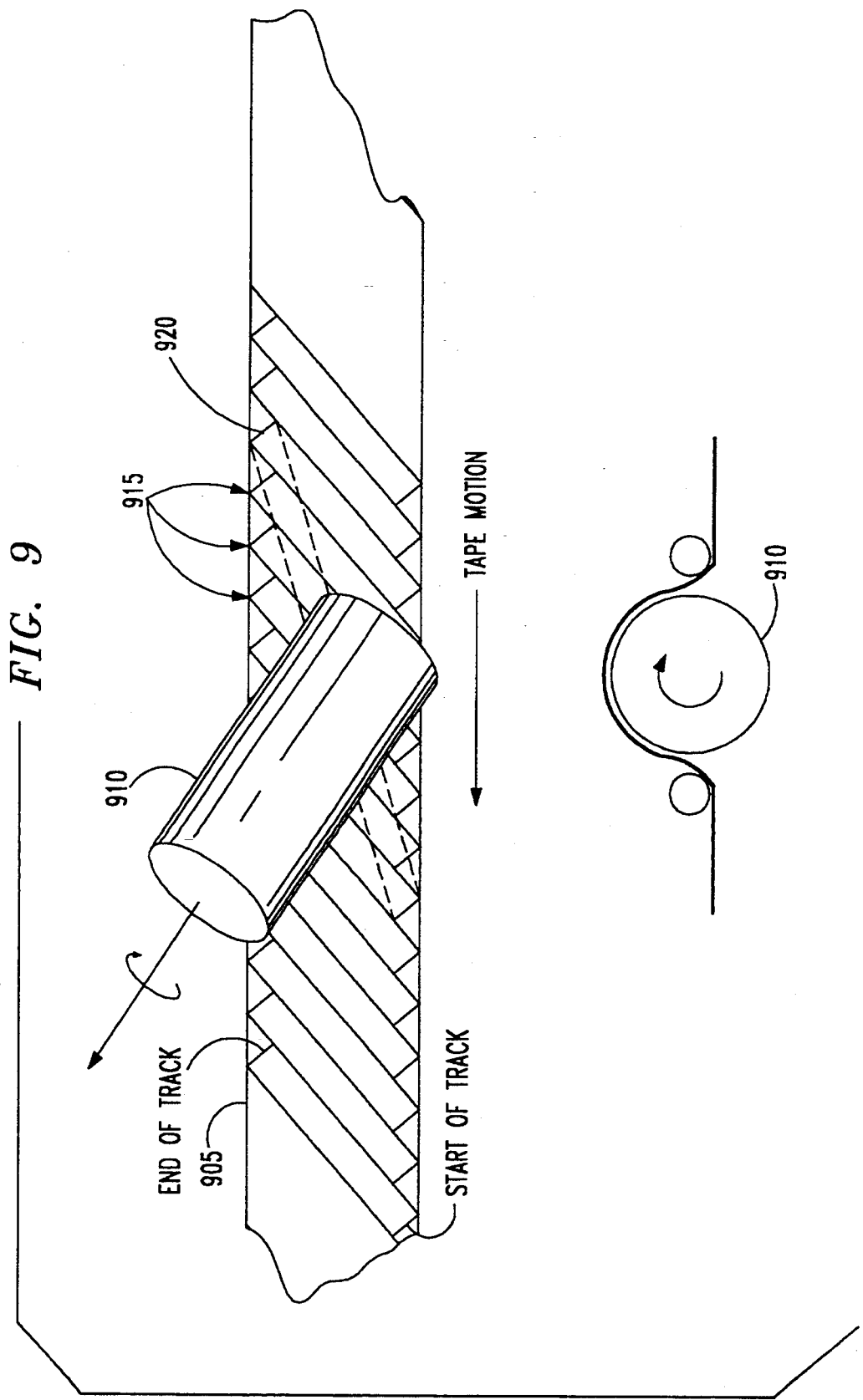
FIG. 9 shows the structural alignment of a tape with a read/record head of a conventional VTR, the combination being usable for displaying the high definition signal.

Referring next to FIG. 9, there is shown the structural alignment of a tape 905 with a read/record head 910 of a conventional VTR. As the tape 905 moves from right to left, it passes around the rotating read/record head 910 which is skewed in relation to this tape as shown. As data is recorded onto the tape 905, the head 910 creates diagonal tracks 915 of recorded information, these tracks being related to the direction of tape movement. In conventional VTRs operating in an NTSC format, each track contains the data of a field, and pairs of tracks contain the data for a frame. As indicated, under normal conditions of playback, these conventional VTRs will satisfactorily reproduce the compressed video data recorded in the DSC-HDTV format without modification either to the VTR or to the DSC-HDTV format.

While reading in a normal speed mode, the rotating head 910 traverses the diagonal path illustrated by the tracks 915 and reads the data recorded on the tape 905. When operating in a fast speed mode for searching (forward or reverse), however, the head 910 traverses a different path. If, for example, a search takes place at seven times normal speed, the head 910 traverses across seven tracks generating the path illustrated by track 920.

In the fast speed mode, the head 910 is able to read a portion from each track 915 lying in the path illustrated by track 920, but is unable to totally read any one track. Since the code for the compressed video data consists of frame differences, losing the beginning of this code prevents proper decoding of the data. As earlier indicated, with reference to FIG. 1, motion vectors are employed in the video transmitter 100 in generating the DFD which is indicative of the motion of blocks from frame to frame.

To minimize the loss of data in the fast speed mode, or whenever the beginning of a code of frame differences is not available, the variable length code may be restarter at a segment in the data stream. Each segment contains at least the beginning of one slice and each slice contains not only the frame differences, but also, in accordance with the invention, a small fraction of the original image such that a usable picture can be decoded from an isolated slice by amplifying the difference slice by a factor. The resulting picture, however, will have slightly lower resolution than the original and areas which had high amplitude in the original will be clipped. Each segment contains a header which allows the location of the beginning of the first slice in that segment.

The signal in the slices comprises a number of samples. Each sample contains, as earlier indicated herein, a DFD signal portion and a leak signal portion. The leak signal portion of this signal is fairly small and is transmitted as a portion of the global segment. The scaling is 1/leak factor. In order to recover the leak signal, a threshold is applied to the signal in the slices where the DFD portion predominates. Thus those slice signals above a predetermined threshold do not get amplified while the leak signal is being accentuated. Employing a threshold is just one scheme/or nonlinear amplification. It will be apparent to those skilled in the art that other nonlinear schemes are available and may be used without departing from the spirit and scope of this invention.

Since only a fraction of the slices for a given HD frame are decoded, data for a given slice is overwritten in an output buffer in decoder 720, shown in FIG. 7, only when data for a replacement slice exists. The result is that the slices being read by the VTR read/record apparatus 715 are not read in sequential order. If this resulting image were displayed, it would give the appearance of random updating of image slices. By having a buffer in the decoder 720 that maintains all previously obtained slices that are not overwritten, the effect to the user is that of a much smoother picture transition.

Copies of the data in occupied segments are created in the previously mentioned empty segments, in accordance with the invention, so as to increase the chances that this data is read during fast-forward and fast-reverse operation. The first information to be copied in the empty segments is the global information since that is the most important information in the data stream. To the extent that there is room, segments containing the information that is transmitted in the 1-bit per symbol modulation scheme is also copied. Also the data in some segments that is not so important may be discarded in favor of duplicating other more important information (such as the global information) a larger number of times to increase the possibility that the read head 910 will encounter this information.

In order for copies of the copied segments to not be used during normal operation, a flag is set to identify the segment copies as such. This flag is easily derived from the segment number (such as SLICE numbers greater than some predetermined number). It also may be derived by employing an extra bit in the segment number.

For further enhancing the likelihood that valuable information, e.g., the global information, is read by the read head during fast operation, the recorded copies advantageously may be made in a segment space that is not adjacent to the original segment space. In effect a time diversity is created through this space diversity. This also provides some measure of protection against maladies in the tape itself. During normal operation when a slice is determined to be defective (because a section of the tape is bad) the copy of that slice, to the extent it is reproduced elsewhere on the tape, may be used.

For freeze or still frames the buffer is not operated and the leak factor and motion vectors are zero. For slow forward motion the previous frame is repeated once before providing the current frame. Producing each frame twice provides the desired reduction in speed.

Slow reverse is achieved by always processing N frames at a time. That is, to show frame N the previous N frames are obtained, the channel change procedure is applied to the first frame and by the time the full N frames have been processed, the Nth frame comprises a fairly good image.

Figure 10:
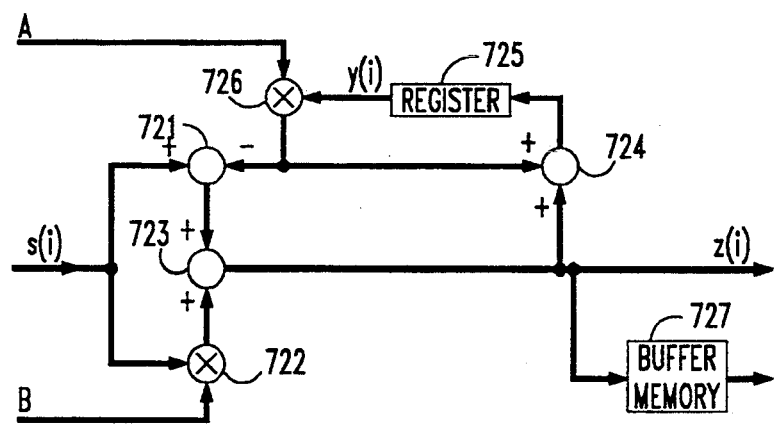
FIG. 10 shows a block diagram of a decoder circuit suitable for use in the VTR shown in FIG. 7. in accordance with the invention.

FIG. 10 shows a block diagram of a decoder circuit suitable for use as the decoder 720 shown in FIG. 7. This decoder circuit is operable in facilitating the operation of the VTR 700 while operating in the special modes such as fast forward and fast reverse. An input signal s(i) is applied to the + input of a subtracter 721 and to a multiplier 722 that multiplies the input signal by some value B. The output of the subtracter 721 is added to the output of the multiplier 722 in an adder 723. An output signal z(i) is obtained from this adder. The signal from the adder is also applied to a summer 724. The output of the summer 724 is delayed one clock period while being stored in a register 725. The output of the register 725, y(i), is multiplied by some value A and applied both to the summer 724 and to the negative input of the subtracter 721.
Thus, $$y(i) = Ay(i-1) + z(i-1)$$

and $$z(i) = s(i) - Ay(i) + Bs(i)$$

y(i) is recursive. When the recursion is carried out, the result is:

$$y(i) = A^N y(i-N) + A^{(N-1)} z(i-N) + A^{(N-2)} z(i-N-1) + \ldots + Az(i-2) + z(i-1)$$

or $$y(i) - A^N y(i-1-N) = \sum_{j=0}^{N-1} A^j z(i-1-j)$$

If A is less than 1 and N is large enough, then $A^N$ is equal to 0. Thus the second term on the left side of the equation disappears. Substituting in the second equation above yields:

$$z(i) = (1 + B)s(i) - A \sum_{j=0}^{N-1} A^j z(i-1-j)$$

or $$\sum_{j=0}^{N} A^j z(i-j) = (1+B)s(i)$$

The above says that to recover s(i) flora z signals, take the last Nz signals, multiply each by A raised to a power that depends on the age of the z signal, sum all the products, and divide the result by 1+B.

In the forward direction the latest z's are obtained. This signal may be recovered by keeping the individual z's and each time performing the multiplications and addition. This signal may also be recovered by keeping the last sum, multiplying it by A (thereby multiplying all the components by A and in the process deleting the oldest one — because it is multiplied out of existence) and then adding the latest z,z(i).

In the backward direction, the individual z's have to be kept. Here too, the current sum is kept. But, when z(i−N−1) arrives, the sum must be divided by A and z(i) must be subtracted. z(i−N−1) multiplied by $A^N$ must also be added. This must be done with reasonable accuracy because while z(i−N−1) is shrunk by multiplying it by A N, when it is divided by A, the lost bits must be recovered. So, if reasonable accuracy is maintained, backward processing may be achieved with a register to store the final output, a memory to store the Nz values, a multiplier (by $A^N$), a divider (by A), and an adder and a subtracter.

An alternative implementation of the decoder is to simply employ a filter (finite impulse response). The z values are put into an N stage register. The first stage (holding the most recent input which is the oldest recorded time) output is multiplied by $A^N$, the second stage output is multiplied by $A^{N-1}$, etc., until the Nth stage output where the latest recorded time z value is held is multiplied by 1. The multiplied outputs are added to yield the final result.

Obviously, many modifications and variations of the present invention are possible in light of the above teachings. It is therefore to be understood that within the scope of the appended claims, the invention may be practiced otherwise than as specifically described.

We claim:

1. An apparatus for decoding digital data representative of a compressed digital image signal, said digital data being arranged in a variable length coding format in a plurality of field time intervals, each field time interval further including a plurality of segment times populated with the digital data, the digital data including data originally formatted as both 1-bit per symbol digital data and 2-bit per symbol digital data, the apparatus comprising:

means for decoding the 1-bit per symbol digital data contained in each of adjacent pairs of the plurality of segment times to yield empty segment times;

means for duplicating originally formatted data contained in selected ones of the plurality of segment times; and means for repopulating said empty segment times with said data which duplicates the originally formatted data contained in said selected segment times.

2. The apparatus of claim 1 wherein said empty segment times are repopulated by said repopulating means with data which duplicates the originally formatted data contained in adjacent segment times.

3. The apparatus of claim 2 wherein said empty segment times are repopulated by said repopulating means with data which duplicates the original data contained in segment times located other than adjacent to said empty segment times.

4. The apparatus of claim 3 wherein said repopulating means repopulates the empty segment times with global information from other segment times.

5. The apparatus of claim 4 wherein said repopulating means repopulates the empty segment times with information from other segment times transmitted in a 1-bit per symbol format.

6. An apparatus for decoding digital data representative of a compressed digital image signal, said digital data being arranged in a variable length coding format in a plurality of field time intervals, each field time interval further including a plurality of segment times populated with the digital data, the digital data including data originally formatted as both 1-bit per symbol digital data and 2-bit per symbol digital data, the apparatus comprising:

means for decoding the 1-bit per symbol digital data contained in each of adjacent pairs of the plurality of segment times to yield empty segment times;

means for duplicating originally formatted data contained in selected ones of the plurality of segment times;

means for repopulating said empty segment times with said data which duplicates the originally formatted data contained in said selected segment times; and means for recording the originally formatted digital data and duplicate data provided by said repopulating means on a storage medium for subsequent display.

7. The apparatus of claim 6 wherein the storage medium is a tape.

8. The apparatus of claim 6 wherein the storage medium is an optical disk.

9. The apparatus of claim 6 further comprising means for inspecting the recorded digital data, the inspecting means attempting to read the originally formatted data stored in segment times and upon being unable to read this data, attempting to read the duplicate data stored in other segment times.

10. The apparatus of claim 9 further comprising assigning means for associating an identifying means with each one of the repopulated segment times, the identifying means preventing the use of the recorded digital data in the repopulated segment times during normal reading of the originally formatted data by the inspecting means.

11. The apparatus of claim 9 wherein the inspecting means reads data stored in the segment times in a normal speed.

12. The apparatus of claim 9 wherein the inspecting means reads data stored in the segment times in a fast forward speed.

13. The apparatus of claim 12 wherein the originally formatted data and the duplicate data stored in the segment times comprises variable length code data, said variable length code data containing a fraction of an original video image recorded as a leak factor for reconstructing a usable quality image from a single compressed frame responsive to the inspecting means reading the data stored in the segment times in a fast forward speed.

14. The apparatus of claim 13 further comprising means for amplifying the leak factor in response to the inspecting means reading the data stored in the segment times in a fast forward speed.

15. The apparatus of claim 14 further comprising means for limiting the level of amplification of the digital data contained in the segment times, the limiting means being applied to the data in the segment times other than the data recorded as the leak factor.

16. The apparatus of claim 6 further comprising inspecting means for reading data stored in the segment times in a fast backward speed.

17. The apparatus of claim 16 wherein the data stored in the segment times comprises variable length code data, said data containing a traction of an original video image recorded as a leak factor.

18. The apparatus of claim 17 further comprising means for amplifying the leak factor in response to the inspecting means reading the data stored in the segment times in a fast backward speed.

19. The apparatus of claim 18 further comprising means for limiting the level of amplification of the digital data contained in the segment times, responsive to the inspecting means reading the data stored in the segment times in a fast backward speed, the limiting means being applied to the data in the segment tinges other than the data recorded as the leak factor.

20. The apparatus of claim 6 further comprising inspecting means liar reading the data stored in the segment times in a slow forward speed.

21. The apparatus of claim 20 further comprising means for processing N frames at a time where N is a number of the previous N frames, the processing means including obtaining the previous N frames and combining these frames for generating a high definition image for display.

22. The apparatus of claim 6 further comprising inspecting means for reading data stored in the segment times in a slow backward speed.

23. The apparatus of claim 6 further comprising inspecting means for reading data stored in the segment times for providing a freeze frame.

24. The apparatus of claim 23 further comprising a buffer means storing the data stored in the segment times, the buffer being inhibited from being updated while the freeze frame is being provided.

25. A method for decoding digital data representative of a compressed digital image signal, the digital data being arranged in a variable length coding format in a plurality of field time intervals, each field time interval further including a plurality of segment times populated with the digital data, the digital data including data originally formatted as both 1-bit per symbol digital data and 2-bit per symbol digital data, the method comprising the steps of:

decoding the 1-bit per symbol digital data contained in each of adjacent pairs of the plurality of segment times to yield empty segment times;

duplicating originally formatted data contained in selected ones of the plurality of segment times; and repopulating said empty segment times with said data which duplicates the originally formatted data contained in said selected segment times.

26. The method of claim 25 further comprising the step of repopulating said empty segment times with data which duplicates the originally formatted data contained in adjacent segment times.

27. The method of claim 26 further comprising the step of repopulating said empty segment times with duplicate data which duplicates the originally formatted data contained in segment times located other than adjacent to said empty segment times.

28. The method of claim 27 wherein the duplicate data is recorded on a storage medium for subsequent display.

29. The method of claim 28 wherein the storage medium is a tape.

30. The method of claim 28 wherein the storage medium is an optical disk.

31. The method of claim 27 further comprising the steps of attempting to read the originally formatted data stored in segment times and upon being unable to read this data, attempting to read the duplicate data stored in other segment times.

* * * * *